United States Patent

[11] 3,595,321

| [72] | Inventor | Milton G. Dickey<br>Pine Bluff, Ark. |
|---|---|---|
| [21] | Appl. No. | 3,438 |
| [22] | Filed | Jan. 16, 1970 |
| [45] | Patented | July 27, 1971 |
| [73] | Assignee | Farmers Tractor and Equipment Company<br>Pine Bluff, Ark.<br>Continuation of application Ser. No.<br>511,118, Dec. 2, 1965, now abandoned. |

[54] CULTIVATOR FENDER
13 Claims, 6 Drawing Figs.

[52] U.S. Cl..................................................... 172/513,
172/705, 172/764
[51] Int. Cl....................................................... A01b 17/00
[50] Field of Search............................................ 172/513,
512, 508, 509, 81, 112, 387, 393, 705, 764; 111/7

[56] References Cited
UNITED STATES PATENTS

| 1,318,419 | 10/1919 | Vathing...................... | 172/387 |
|---|---|---|---|
| 1,847,493 | 3/1932 | Oglesbee..................... | 172/513 |
| 2,465,043 | 3/1949 | Schumacher et al. ...... | 172/513 |
| 2,673,511 | 3/1954 | Roberts....................... | 172/722 |
| 2,804,815 | 9/1957 | Dollen......................... | 172/513 X |

*Primary Examiner*—Robert E. Pulfrey
*Assistant Examiner*—Stephen C. Pellegrino
*Attorney*—Koenig, Senniger, Powers and Leavitt ABSTRACT: A cultivator fender for being dragged along the ground by a cultivator vehicle to shield a row of crops from having earth, cultivated alongside the row by cultivators carried by the vehicle, thrown onto the row. The fender includes a pair of generally vertical elongate shields extending parallel to one another and spaced apart for being dragged along the ground by the vehicle on opposite sides of the row, suspension means adapted for connection to the cultivator, and a link interconnecting each shield and the suspension means. Articulating pivotal connections are provided between the forward end of each link and the suspension means and between the rearward end of each link and its shield to permit the swinging of the links relative to the suspension means and to permit swinging angular movement of the shields relative to the links in response to changing ground contours as the fender is dragged along the ground.

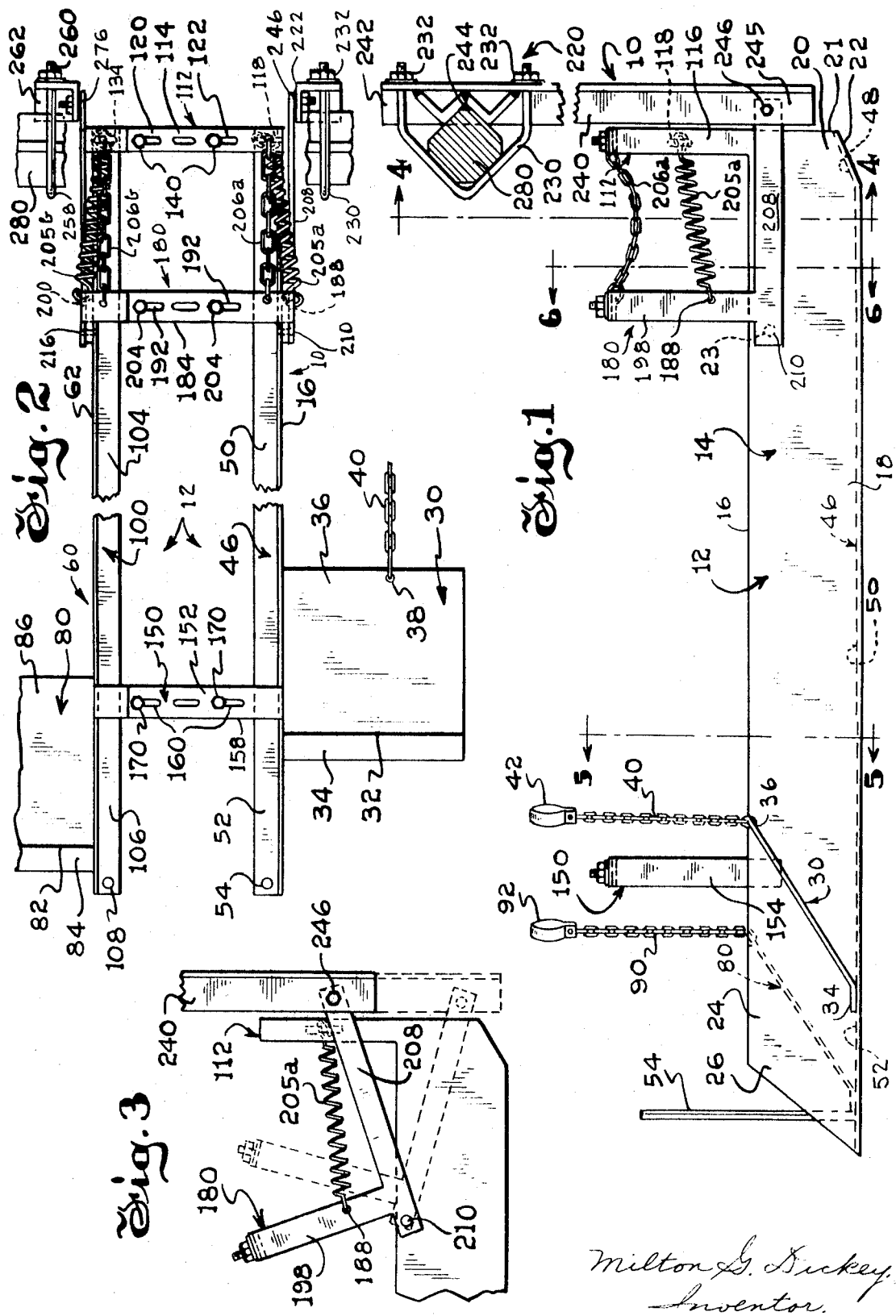

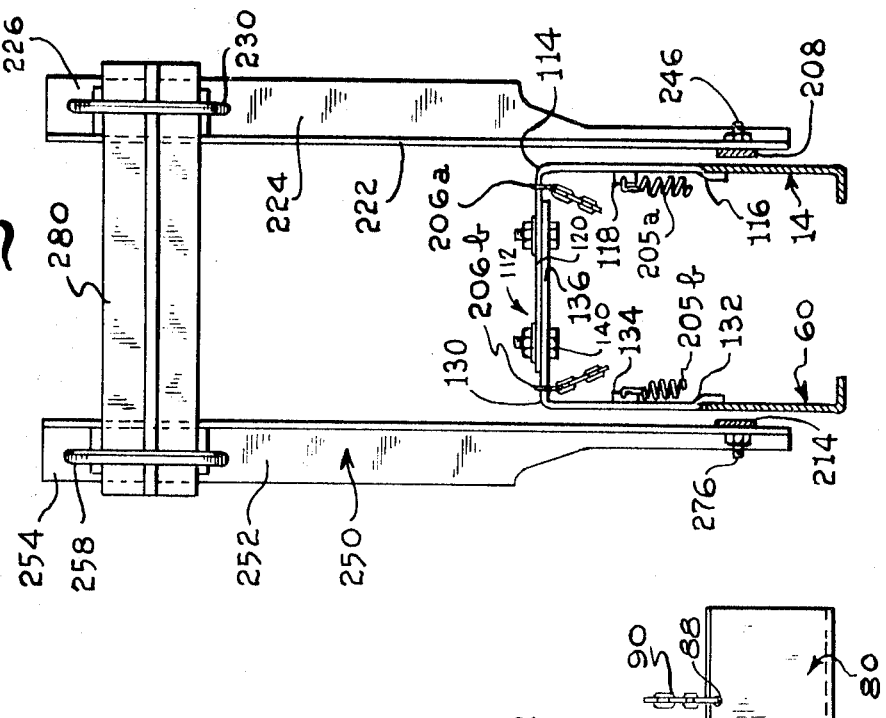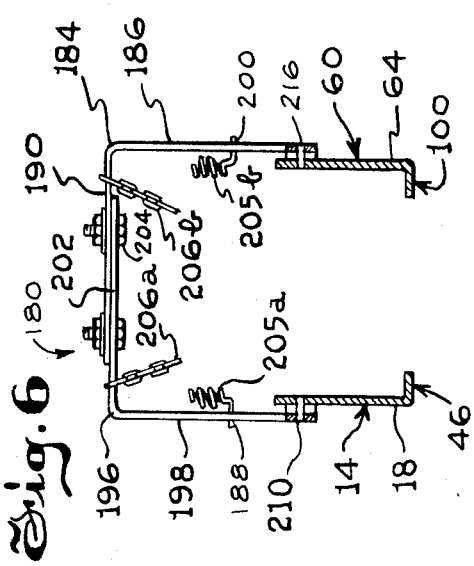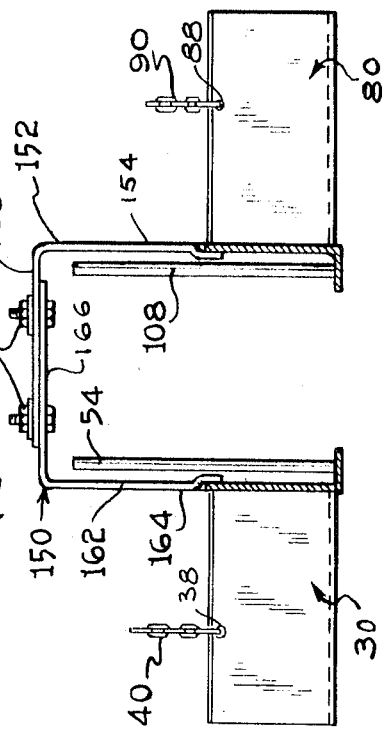

CULTIVATOR FENDER

CROSS-REFERENCE TO RELATED APPLICATION

This application is a continuation of my copending application, Ser. No. 511,118, filed Dec. 2, 1965 now abandoned.

BACKGROUND OF THE INVENTION

In cultivating row crops which have been planted in or are in a sterilized band of soil, it is imperative that untreated soil from between the rows be kept away from the treated soil of the rows themselves; otherwise the value of the treatment is lost. Accordingly, shields or fenders have been developed for this purpose. In cultivating row crops which are in a field and blanket sterilized to some shallow depth, for example 2 to 6 inches, it is imperative to confine the cultivated soil to that sterilized area and reform it so that subsequent cultivations will not reach soil below the treated depth, thus mixing untreated with treated soil.

Shields have been developed which are pulled along by the cultivator, traveling on slide runners positioned on either side of the treated band. The runners travel either on the edges of the treated band or on the plowed untreated soil adjacent the treated band. Such shields have tended to be too heavy, especially at the forward ends, with the result that the shields dig into the soil, sometimes making deep gouges. In addition, such shields tend to make ruts because of being drawn over the same path at each plowing. Such shields have never been pulled by a movable arched bridle, and do not always remain in a vertical plane, especially when one side of the row has been eroded by rain or the crops planted on the edge of the row.

SUMMARY OF THE INVENTION

Accordingly, it is an object of this invention to provide a cultivator fender having slide runners which distribute the weight thereof more evenly over the surface area of the runners than those of the prior art.

Another object of the present invention is to provide such cultivator fenders which are light in weight at the forward end, as compared to those of the prior art.

Still another object is to provide a fender of the aforementioned type which has little or no tendency to dig its runners into the soil when in operation.

Yet another object is to provide a fender of the aforementioned type which will not sink deeply into the soil when drawn thereover.

A further object is to provide a fender of the aforementioned type which, in conjunction with the cultivator, smooths the cultivated area.

Still a further object is to provide a fender of the aforementioned type which assures uniformity of land contour with each plowing.

Another object is to provide a fender having the foregoing advantages which is adapted for attaching spraying apparatus.

Still another object is to provide a place on each side of the treated band which will not change in elevation with respect to the treated band from which to apply herbicides and other chemicals.

Yet another object is to provide a fender which will spread a mulch of cultivated soil back over the cultivated area, thus conserving moisture and keeping the soil soft and tillable.

Still a further object is to provide a fender which will firm and smooth the cultivated soil adjacent to the treated band at the level of the treated band to such a degree that it will support the runners thereof at subsequent cultivations.

Yet a further object is to provide apparatus for firming and smoothing the cultivated soil to such a degree that it will lessen the shrinkage of the smoothed cultivated soil to a level lower than the treated band.

Other objects and advantages of the present cultivator fender will become apparent from a detailed consideration of the following part of the specification, including the appended drawings.

BRIEF DESCRIPTION OF THE DRAWINGS

FIG. 1 is an elevational view of the present cultivator shield or fender;

FIG. 2 is a top plan view of the fender as seen in FIG. 1;

FIG. 3 is an elevational view of part of the fender as seen in FIG. 1, but showing the movable character of certain parts by means of broken lines;

FIG. 4 is a sectional view, taken along line 4-4 of FIG. 1;

FIG. 5 is a sectional view, taken along line 5-5 of FIG. 1; and

FIG. 6 is a sectional view, taken along line 6-6 of FIG. 1.

Corresponding reference characters indicate corresponding parts throughout the several views of the drawings.

DESCRIPTION OF THE PREFERRED EMBODIMENT

The present cultivator fender includes generally a rigid member having a channel with sufficient covering to provide the protection desired, at least one inclined plane attached to the rigid member; and a movable connection between the rigid member and the cultivator. More preferred as a movable connection is a movable connecting member interposed between the rigid member and the cultivator; still more preferred is an adapter member attached to the cultivator and connecting the remainder of the apparatus thereto.

The rigid member is preferably constructed of a pair of oppositely disposed shields constituted by sheets of material, the pair of sheets being joined by a spanning member, preferably of adjustable length, at at least one point, more preferably at two points, to form a rigid structure, with a channel resulting between the two sheets. Still more preferred is a spanning member across the tops of the sheets at each end thereof. The channel formed between the two sheets of material is ordinarily high enough to deflect any dirt, etc., thrown up by the cultivator's operation.

At least one inclined plane, preferably a pair, and more preferably an oppositely disposed pair, is attached to the rigid member to plane out any unevenness in the soil as the shield is towed along over the row crops by the cultivator.

The movable connecting member or link connects each rigid member to the adapter member or suspension means in a fashion permitting limited movement therebetween. Preferably, the movement is vertical only, and more preferably is a double pivotal movement. Even more preferred is the addition of means making the connection resilient. The preferred means for accomplishing resiliency is at least one spring and more preferred is a pair of springs.

Turning now to the figures, the cultivator fender is generally designated 10 and includes shield assembly generally designated 12, an arched bridle generally designated 180 and a tool bar adapter or suspension means generally designated 220. The shield assembly 12 forms the rigid member aforementioned and includes a pair of inclined planes generally designated 30 and 80. Springs 205a and 205b form resilient extensible members and tool bar adapter 220 forms the adapter member or suspension means.

Shield assembly 12 includes a generally vertical elongate shield constituted by a first sheet or shield generally designated 14 which is elongated and has a top 16, a bottom 18, a forward portion 20, a rearward potion 24 and a trailing edge 26. Forward portion 20 has leading edge 21, beveled edge 22 and an aperture 23.

The first inclined plane generally designated 30 is attached edgewise to rearward portion 24 of the outwardly facing side of the first sheet. It is divided into two portions by angle or bend 32, a substantially horizontally disposed rearward lower edge portion extending laterally outwardly from the side of the shield and substantially level with the lower edge thereof and designated as trailing portion or flange 34 and a leading portion 36 inclined upwardly in the forward direction of the shield. Leading portion 36 has an aperture 38 to which is attached one end of first chain 40. Chain 40 has first clamp 42 attached to its other end.

A first runner generally designated 46 is at and shown as integral with the bottom 18 of the first sheet and has a forward upwardly extending or turned-up portion 48, an intermediate portion 50 and a rearward portion 52. A post 54 is attached adjacent the rearward end of shield 14 to rearward portion 52, generally perpendicular thereto.

Shield assembly 12 includes a second generally vertical elongate shield constituted by a second sheet or shield generally designated 60 and generally a mirror image of the first sheet 14. Second sheet 60 has a top 62, a bottom 64, and forward and rearward portions, leading and trailing edges, and an aperture similar to those of sheet 14.

A second inclined plane generally designated 80 is attached edgewise adjacent to the rearward end of the second sheet or shield 60 facing outwardly and is divided by angle or bend 82 into a substantially horizontally disposed rearward lower edge portion extending laterally outwardly from the side substantially level with the lower edge of the shield and designated as trailing portion 84 and a leading portion 86 inclined upwardly in the forward direction of the shield. Leading portion 86 has an aperture 88 to which is attached one end of a second chain 90 having a second clamp 92 attached to its other end.

A second runner generally designated 100 is at and shown as integral with the bottom 64 of the second sheet 60 and has a forward upwardly extending or turned-up portion 102, an intermediate portion 104, and a rearward portion 106. Post 108 is attached generally perpendicularly to rearward portion 106 adjacent the rearward end of shield 60.

Shield assembly 12 also includes a first bridging means constituted by an arch generally designated 112 which in turn includes an upper inverted "L" member 114 and a lower inverted "L" member 130. Member 114 has a first leg 116 which is attached to first sheet 14; first leg 116 has a projection 118 which has an aperture. Member 114 further has a second leg 120 which has a multiplicity of slots 122.

Lower inverted "L" member 130 of first arch 112 has a first leg 132 attached to the second sheet 60 and this first leg has a projection 134 with an aperture. Member 130 further has a second leg 136 having a multiplicity of slots in alignment with slots 122, with a pair of nuts and bolts 140 holding the two legs together.

Shield assembly 12 further has a second bridging means or arch generally designated 150. Second arch 150 has an upper inverted "L" member 152 and a lower inverted "L" member 162. Member 152 has a first leg 154 and a second leg 158, the latter leg having a multiplicity of slots 160. Member 162 has a first leg 164 and a second leg 166, the latter leg having a multiplicity of slots in alignment with slots 160. A pair of nuts and bolts 170 hold the two legs together.

An arched bridle or yoke is generally designated 180. Bridle or yoke 180 has a first inverted "L" member 184 and a second inverted "L" member 196. Member 184 has a first leg 186 having an aperture 188, and has a second leg 190 having a multiplicity of slots 192. Member 196 has a first leg 198 of an aperture 200, and has a second leg 202 having a multiplicity of slots in alignment with slots 192. A pair of nuts and bolts 204 secure the two legs together.

A pair of resilient extensible members shown as tension springs 205a and 205b connect the yoke or arched member 180 of the arched bridle to the shield assembly at arch 112, in a resilient manner. Member 180 is further connected to member 112 by means of a pair of chains 206a and 206b which limit the displacement of the members away from each other.

Arched bridle 180 further includes a pair of links constituted by a first longitudinal member generally designated 208 which is integral with first inverted "L" member 184 of arched bridle 180, and pivotally connected at its rearward end to the first sheet 14 at 210, and a second longitudinal member generally designated 214, integral with the second inverted "L" member 196 of yoke 180, and pivotally connected at its rearward end to the second sheet 60 at 216. Legs 198 and 186 constitute angular extensions of links 208 and 214.

Both longitudinal members or links 208 and 214 extend beyond 222 forward portions of the shield assembly and are pivotally attached to tool bar adapter 220 constituting suspension means for the links adapted for connection to the cultivator.

Tool bar adapter 220 has a first upright member 22 which is shaped like an "L" in cross section. Member 222 has a first face 224 which has an upper end 226 which has a pair of apertures therein. The ends of first "U" bolt 230 protrude through these apertures and are threaded for receiving a pair of nuts 232 which hold the bolt to member 222. An inverted "W" member 244 is attached to face 224 and acts in conjunction with bolt 230 to attach the tool bar adapter to the cultivator.

First upright member 222 has a second face 240 which has an upper end 242 and a lower end 245 having a pivotal connection at 246 to member 208.

Tool bar adapter 220 has a second upright member generally designated 250 which is "L"-shaped in cross section. Member 250 has a first face 252 which has an upper portion 254 having a pair of apertures therein. The ends of second "U" bolt 258 protrude through these apertures and are adapted to receive a pair of nuts 260 to secure the bolt to member 250. A second inverted "W" member 262 is attached to upper portion 254.

Member 250 has a second face 270 which has an upper end 272 and a lower end 275 to which the forward end of link 214 is pivotally connected at 276.

Tool bar 280 is a part of the cultivator and is generally square in cross section with beveled edges. The tool bar is locked between the aforementioned inverted "W" members and "U" bolts, thus securing the whole apparatus to the cultivator.

Operation is as follows:

The cultivator is normally towed behind a prime mover, for example a tractor. The cultivator normally has a plurality of sweeps or plow heads which cultivate the soil as the cultivator is towed along. The fender according to the instant invention is attached to the cultivator and is pulled along also, sliding over the ground on runners 46 and 100. Inclined planes 30 and 80 smooth the dirt thrown up by sweeps on the cultivator which are positioned ahead of them, the dirt being pushed ahead and outwardly. Thus uniformity of land contour is introduced into each plowing and the trailing portions of the inclined planes assist in keeping the rear portion of the present shield from sinking very far into the soil as it is towed along.

The cultivator fender 10 is positioned so that the sheets or shields 14, 60 are on opposite sides of a row of crops and shield the row of crops from having earth cultivated alongside the row by the cultivators carried by the vehicle being thrown onto the row. The shields slide over the ground and the bridging means 112,150 maintain them in spaced-apart parallel relation and in a generally vertical position during the cultivation operation. The arrangement of the links 208, 214 being pivotally connected at each of their ends constitutes means for enabling swinging angular movement of the shields relative to the links on a first generally horizontal axis extending transverse to the shields in response to changing ground contours as the fender is dragged along the ground, and adapts the shields to slide over the ground in close contact therewith. This effectively prevents earth cultivated alongside the row by the cultivator from being thrown onto the row and at the same time the forward ends of the shields, due to the double-pivotal action and the positioning of the links forward of the center of length of the shields, are prevented from digging into the ground. FIG. 3 illustrates how the position of the shields is maintained as the links pivot, the links being capable at all times of swinging about the pivotal connections at their forward ends and the shields being capable at all times of swinging about their pivotal connections at the rearward ends of the links.

The pair of resilient extensible members 205a, 205b, each connected at one end to a respective link and at the other end to a respective shield forward of the connection of the link to the shield, assist in preventing the forward ends of the shields from digging into the ground. The arrangement of the links and the double-pivotal action normally will help to do this and thus the resilient extensible members, shown here as springs, simply assist the other parts of the apparatus in accomplishing this purpose.

The yoke 180 connecting the links resists twisting of the fender in operation, for example, when the device is being dragged over roughly ploughed ground. As shown in FIG. 6, each shield has a runner 46, 100 at the bottom thereof which is adapted to slide along the ground. The forward ends of the runners desirably extend upward as shown at 48 and 102, so as to assist in preventing the forward ends of the shields from digging into the ground. Digging of the forward ends of the shields into the ground is further resisted by the beveling of the forward ends of the shields as at 22. The upwardly extending posts 54, 108, attached adjacent the rearward ends of the shields, adapt the fender to the attachment of spraying apparatus so that, for example, spraying may be done simultaneously with the cultivation. Normally, today, this has to be done as a separate operation.

The spacing of the shields from one another can be adjusted to conform to the width of the row being shielded by resetting the nuts and bolts in the slots 122, 160 in the bridging means 112, 150.

The present shield functions normally with sheets 14 and 60 being of sufficient height to deflect dirt, etc., thrown up by the cultivator as it moves along, the row crops passing between the two sheets. However, the two sheets may be closed over by a top member of fixed or adjustable width, if desired.

The present shield is preferably made of welded metal, but other materials may be used, if desired.

In view of the above, it will be seen that the several objects of the invention are achieved and other advantageous results attained.

As various changes can be made in the above constructions without departing from the gist of the invention, it is intended that all matter contained in the above description or shown in the accompanying drawings shall be interpreted as illustrative.

I claim:

1. A cultivator fender for being dragged along the ground by a cultivator vehicle to shield a row of crops from having earth, cultivated alongside the row by cultivators carried by the vehicle, thrown onto the tow comprising:

a pair of generally vertical elongate shields extending parallel to one another and spaced apart for being dragged along the ground by the vehicle on opposite sides of the row, the lower edges of the shields sliding over the ground;

means bridging the shields above the shields and maintaining them in spaced-apart relation and in generally vertical position;

suspension means adapted for connection to the cultivator;

a link interconnecting each shield and the suspension means;

means for enabling swinging angular movement of the shields relative to the links on a first generally horizontal axis extending transverse to the shields in response to changing ground contours as the fender is dragged along the ground, the last said means comprising an articulating pivotal connection between the rearward end of each link and its shield positioned forward of the center of the length of the shield and an articulating pivotal connection between the forward end of each link and the suspension means for swinging of the links relative to the suspension means on a second generally horizontal axis parallel to the first axis, said links being capable at all times of swinging about the pivotal connections at their forward ends and the shields being capable at all times of swinging about their pivotal connections at the rearward ends of the links whereby the shields are adapted to slide over the ground in contact therewith and the lower edges of the shields are adapted to follow the ground contour by pivoting of the links relative to the suspension means and pivoting of the shields relative to the links for effectively preventing earth cultivated alongside the row by the cultivator from being thrown onto the row and the forward ends of the shields are prevented from digging into the ground.

2. The cultivator fender of claim 1 including a pair of inclined planes each attached to an outwardly facing side of a respective shield for smoothing the earth cultivated alongside the row by the cultivator, each said inclined plane having a lower edge portion extending laterally outwardly from said side of the respective shield substantially level with the lower edge of the shield, and said inclined plane being located adjacent the rearward end of the respective shield and inclined upwardly in the forward direction of the respective shield.

3. The cultivator fender of claim 1 including a pair of resilient extensible members each connected at one end to a respective link and at the other end to a respective shield forward of the connection of the link to the shield and biasing the forward ends of the shields upwardly so as to assist in preventing the forward ends of the shields from digging into the ground.

4. The cultivator fender of claim 3 wherein the links have angular extensions and the resilient extensible members are tension springs connected between said extensions and the shields.

5. The cultivator fender of claim 1 including means limiting the pivotal movement of the links with respect to the shields.

6. The cultivator fender of claim 1 wherein said bridging means includes a yoke connecting the links so as to resist twisting of the fender.

7. The cultivator fender of claim 1 wherein each shield has a runner at the bottom thereof adapted to slide along the ground.

8. The cultivator fender of claim 7 including an upwardly extending post attached adjacent the rearward end of each shield whereby spraying apparatus may be mounted thereon.

9. The cultivator fender of claim 8 wherein the forward ends of the runners extend upwardly so as to assist in preventing the forward ends of the shields from digging into the ground.

10. The cultivator fender of claim 1 wherein the forward ends of the shields are beveled so as to resist digging into the ground.

11. The cultivator fender of claim 2 wherein each inclined plane has a flange extending generally horizontally rearward at its said lower edge portion substantially level with the lower edge of the respective shield.

12. The cultivator fender of claim 1 wherein the bridging means is adjustable for adjusting the spacing of the shields one from another.

13. A cultivator fender which comprises a rigid member having a pair of oppositely disposed elongate sheets and a pair of strapping members connecting the two sheets, the sheets being adapted to be dragged edgewise over the ground; an arched bridle having one end connected to pivot to one sheet and the other end attached pivotally to the other sheet, the arched bridle having a pair of projections, each on opposite sides of the said sheets; an adapter member having an upper end and lower end, the upper end being rigidly connected to a cultivator and the lower end being pivotally connected to the pair of projections of the arched bridle; a pair of springs connecting the arched bridle to the sheets; a pair of inclined planes disposed on opposite sides of said sheets for smoothing earth along the path of the shield; and means to limit the pivotal movement of the arched bridle with respect to the sheets.